United States Patent [19]

Sikdar et al.

[11] Patent Number: 4,515,936

[45] Date of Patent: May 7, 1985

[54] CATALYZED INTERFACIAL POLYCONDENSATION POLYCARBONATE PROCESS

[75] Inventors: Subhas K. Sikdar, Clifton Park; Yaw D. Yeboah, Schenectady, both of N.Y.

[73] Assignee: General Electric Company, Schenectady, N.Y.

[21] Appl. No.: 600,634

[22] Filed: Apr. 16, 1984

[51] Int. Cl.$^3$ .............................................. C08G 63/62
[52] U.S. Cl. ..................... 528/200; 524/714; 524/745; 524/841; 528/196; 528/198; 528/199
[58] Field of Search ............... 528/196, 198, 199, 200; 524/841, 714, 745

[56] References Cited

U.S. PATENT DOCUMENTS

| | | | |
|---|---|---|---|
| 3,153,008 | 10/1964 | Fox | 528/202 |
| 3,318,845 | 5/1967 | Dietrich et al. | 528/196 |
| 3,376,261 | 4/1968 | Jackson, Jr. et al. | 528/196 |
| 4,368,315 | 1/1983 | Sikdar | 528/198 |
| 4,384,108 | 5/1983 | Campbell et al. | 528/196 |

*Primary Examiner*—Theodore E. Pertilla
*Attorney, Agent, or Firm*—Richard J. Traverso; James C. Davis, Jr.; James Magee, Jr.

[57] ABSTRACT

This invention relates to a catalyzed interfacial polycondensation aromatic polycarbonate process which comprises forming an agitated two-phase mixture comprising an organic solvent phase with catalyst and an aqueous phase containing an aromatic dihydroxy compound, a base and an ionic surfactant. A carbonyl halide is added to the mixture and reacted with the aromatic dihydroxy compound to form an aromatic polycarbonate. The aromatic polycarbonate is recovered from the aqueous phase.

16 Claims, No Drawings

CATALYZED INTERFACIAL POLYCONDENSATION POLYCARBONATE PROCESS

BACKGROUND OF THE INVENTION

This invention relates to a method of producing polycarbonate by a catalyzed interfacial polycondensation polycarbonate process wherein the polycarbonate is formed in the aqueous phase by using a low organic to aqueous phase volume ratio. More particularly, this invention involves the addition of ionic surfactants to the aqueous phase of the reaction medium to provide more useful polycarbonates.

An interfacial polycondensation polycarbonate process wherein the polycarbonate is formed in the liquid aqueous phase has been reported by Sikdar in U.S. Pat. No. 4,368,315, assigned to the same assignee as the present invention. Sikdar discloses the use of a two-phase reactant admixture containing a liquid inert organic solvent phase and a liquid aqueous phase having a volume ratio within the range of from 0.04:1 to 0.20:1 during the preparation of an aromatic polycarbonate having a weight-average molecular weight ($\overline{M}_W$) of at least about 2000. The process disclosed by Sikdar provides the benefits of (1) utilizing reduced amounts of liquid phase inert organic solvent during the poly-condensation process and (2) the elimination or reduced use of (a) an antisolvent in the separation and recovery of polycarbonate from the reaction environment and/or (b) steam precipitation to recover polycarbonate from the organic phase. This is permitted since substantially all the polycarbonate formed precipitates in-situ in the aqueous phase.

While this process has provided acceptable aromatic polycarbonates, there still remains room for improvement. For example, the process comprising this invention produces more useful polycarbonates having intrinsic viscosities above 0.4 dl/g. The most useful polycarbonates generally have intrinsic viscosities within the range of 0.4 to 0.7 dl/g. In addition, where a phase ratio above 0.08 is utilized in the process disclosed by Sikdar, the polycarbonate often precipitates as agglomerated solids rather than fine particles. This invention overcomes the problem of agglomeration and produces polycarbonate in particulate form over a wider range of process variables.

SUMMARY OF THE INVENTION

This invention embodies a catalyzed interfacial polycondensation process for producing aromatic polycarbonate comprising (1) forming an agitated two-phase mixture comprising
  (i) an organic phase comprising an inert organic solvent and a polycondensation catalyst,
  (ii) an aqueous phase having a pH of at least 11 comprising a solution of aromatic dihydroxy compound, a strong base, an ionic surfactant and, optionally, a chain stopper, subject to the proviso that:
    (a) the volume ratio of inert organic solvent phase to aqueous phase is within the range of from 0.04:1 to 0.20:1 and
    (b) the mole ratio of base to aromatic dihydroxy compound is at least about 0.25:1, (2) adding and reacting a carbonyl halide with the aromatic dihydroxy compound to form an aromatic polycarbonate having a $\overline{M}_W$ of at least 2000, and (3) recovering the solid aromatic polycarbonate particulate from the liquid aqueous phase.

OBJECTS OF THE INVENTION

An object of the present invention is to improve the aromatic polycarbonate produced from a catalyzed interfacial polycondensation polycarbonate process which utilizes low organic to aqueous phase volume ratios.

Another object of the present invention is to reduce the agglomeration of solids when precipitating aromatic polycarbonate within a catalyzed interfacial polycondensation polycarbonate process.

Another object of the present invention is to provide a catalyzed interfacial polycondensation polycarbonate process which consistently produces aromatic polycarbonate having an intrinsic viscosity above 0.4 dl/g.

DETAILED DESCRIPTION OF THE PREFERRED EMBODIMENTS

The polycarbonates prepared by the process described herein, are preferably, non-sterically-hindered aromatic polycarbontes ("NSH-aromatic-PC") and include compounds well known to those skilled in the art.

The expression "NSH-aromatic-PC" as employed herein and in the claims includes aromatic polycarbonates containing a major portion of NSH-polycarbonate moieties (derived from non-sterically-hindered dihydroxy aromatic compounds) with the remaining portion comprising sterically-hindered polycarbonate moieties (derived from sterically-hindered dihydroxy aromatic compounds). A major portion being defined as more than 50 mole % of the polycarbonate moieties. The NSH-aromatic-PC frequently have about 90–100 mole % non-sterically-hindered polycarbonate moieties.

The expression "non-sterically-hindered dihydric (or dihyroxy) aromatic compounds" as employed herein and in the claims includes any dihydric phenol free of steric hindrance, i.e. dihydric phenols having neither hydroxy group sterically hindered by the presence of a halogen, hydrocarbon or hydrocarbonoxy group ortho-positioned relative to the hydroxy groups of a dihydric phenol. Conversely, sterically-hindered dihydric phenols are defined herein as dihydric phenols having a halogen, hydrocarbon or hydrocarbonoxy group ortho-positioned relative to the hydroxy groups of said dihydroxy phenol.

These NSH-dihydric aromatic compounds are well-known to those skilled in the art as illustrated by Fox in U.S. Pat. No. 3,153,008 and can be illustrated by the formula below:

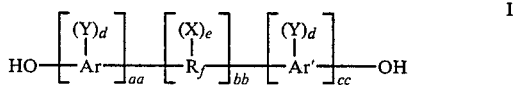

In Formula I, $R_f$ is selected from (a) a group of hydrocarbon linkages consisting of alkylene, alkylidene (including "vinylidene", cycloalkylene, cycloalkylidene) and arylene linkages and mixtures thereof and (b) a linkage selected from the group consisting of ether, amine, carbonyl, sulfur, and phosphorous linkages. Ar and Ar' are arene radicals and Y is a monovalent radical selected from a group consisting of bromine, chlorine, alkyl and alkoxy radicals. Each d represents a whole number from zero to a maximum equivalent to the number of replaceable hydrogens substituted on the aromatic rings comprising Ar and Ar', subject to the proviso that when d is equal to 2 or more, no more than one Y group is ortho-positioned relative to an OH group. The monovalent radical X is selected from the group consisting of bromine, chlorine, alkyl, aryl and cycloalkyl radicals and mixtures thereof. The symbol e represents a whole number of from zero to a maximum controlled by the number of replaceable hydrogens on $R_f$. The symbols aa, bb and cc represent whole numbers including 0 with the proviso that when bb is greater than 0, neither aa nor cc may be 0 and when bb is 0, either aa or cc may be 0, but not both.

Included in the NSH-dihydric aromatic compounds of formula I are those described in greater detail in U.S. Pat. No. 4,368,315 of Subhas K. Sikdar at columns 3 and 4, which—for purposes of brevity—are incorporated herein in their entirety by reference. Some specific examples of some NSH-dihydric phenols are, for example, the following:
4,4'-dihydroxy-diphenyl;
4,4'-dihydroxy-diphenyl methane;
4,4'-dihydroxy-diphenyl-1,1-ethane;
4,4'-dihydroxy-diphenyl-1,1-butane;
4,4'-dihydroxy-diphenyl-1,1-isobutane;
4,4'-dihydroxy-diphenyl-2,2-propane;
4,4'-dihydroxy-3-methyl-diphenyl-2,2-propane;
4,4'-dihydroxy-3-cyclohexyl-diphenyl-2,2-propane;
4,4'-dihydroxy-3-methoxy-diphenyl-2,2-propane;
4,4'-dihydroxy-3,3'-dimethyl-diphenyl-2,2-propane;
4,4'-dihydroxy-3,3'-dichloro-diphenyl-2,2-propane;
4,4'-dihydroxy-diphenyl ether;
4,4'-dihydroxy-diphenyl sulfide;
4,4'-dihydroxy-diphenyl sulfoxide;
4,4'-dihydroxy-diphenyl sulfone;
2,2-bis(4-hydroxy-phenyl)-1,1-dichloroethylene; and
2,2-bis(4-hydroxy-phenyl)-1,1-dibromoethylene.

Some specific examples of the SH-dihydroxy aromatic compounds that are optionally employed in the practice of this invention (also referred to as SH-dihydric phenols or as SH-bisphenols) include the following:
2,2-bis(3-methyl-5-ethyl-4-hydroxyphenyl)propane;
2,2-bis(3,5-dibromo-4-hydroxyohenyl)propane;
2,2-bis(3,5-diisopropyl-4-hydroxyphenyl)propane;
2,2-bis(4-hydroxy-3,5-dimethylphenyl)propane; and
2,2-bis(3,5-dimethyl-4-hydroxyphenyl)-1,1-dichloroethylene.
1,1-bis(4-hydroxy-3,5-dimethylphenyl) methane;
1,1-bis(3,5-diethyl-4-hydroxyphenyl)methane;
1,1-bis(3,5-diisopropyl-4-hydroxyphenyl) methane;
1,1-bis(3,5-dibromo-4-hydroxyphenyl)methane;
1,1-bis(3,5-dimethyl-4-hydroxyphenyl)ethane;
1,1-bis(3-methyl-5-ethyl-4-hydroxyphenyl)ethane;
1,1-bis(3,5-diethyl-4-hydroxyphenyl)ethane;
2,4'-dihydroxy-3,3',5,5'-tetramethyldiphenyl) methane;
2,4'-dihydroxy-3,3',5,5'-tetramethylbenzophenone;
4,4'-dihydroxy-3,3',5,5'-tetraethyldiphenyl sulfone;
4,4'-dihydroxy-3,3',5,5'-tetrabutyldiphenyl sulfide;
4,4'-dihydroxy-3,3',5,5'-tetramethyldiphenyl ether;
4,4'-dihydroxy-3,3',5,5'-tetrapropyldiphenyl sulfoxide;
2,2-bis(3,5-dimethyl-4-hydroxyphenyl)-1-chloroethylene;
2,2-bis(3,5-dibutoxy-4-hydroxyphenyl)-1-1-dibrombethylene, etc.

The non-sterically-hindered aromatic polycarbonates prepared by the process comprising this invention may be illustrated by the formula below:

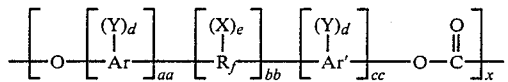

wherein $R_f$, Ar, Ar', Y, d, X, e, aa, bb, and cc are as defined above and x is a number of at least 10, preferably from 2 to 200 or higher, and often more preferably from 30 to 100.

Presently preferred non-sterically-hindered aromatic polycarbonate segments are illustrated by the formulas:

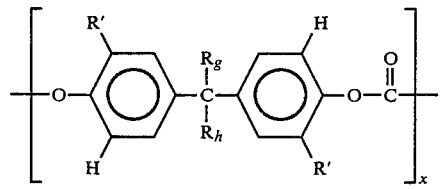

and

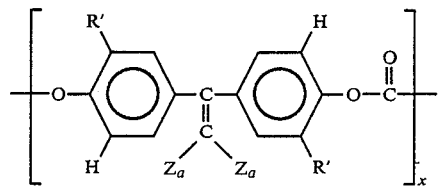

where independently each R' is selected from a group of monovalent radicals consisting of hydrogen, bromine, chlorine, alkyl radicals of from 1 to 4 carbon atoms and alkoxy radicals of from 1 to 4 carbon atoms. The monovalent radicals $R_g$ and $R_h$ are selected from the group consisting of hydrogen and alkyl radicals of from 1 to 2 carbon atoms. Each $Z_a$ is selected from the group consisting of hydrogen, bromine and chlorine, subject to the proviso that at least one $Z_a$ is chlorine or bromine. The symbol x is a number of at least 10, preferably from 20 to 200 or higher and often more preferably from 30 to 100.

The first step in the process comprising this invention is to form an agitated two-phase mixture comprised of an organic phase and aqueous phase. The volume ratio of the inert organic solvent phase to the aqueous phase is within the range of from 0.04:1 to 0.20:1 so as to provide precipitation of the aromatic polycarbonate produced in the aqueous phase. The most preferred volume ratio is from about 0.08:1 to about 0.10:1.

The organic phase comprises an inert organic solvent and a polycondensation catalyst. The polycondensation catalyst can be any hydrogen halide acceptor commonly employed in interfacial polycondensation reactions. Illustrative of well known catalysts are the following: trimethylamine, triethylamine, allyldiethylamine, benzyl dimethylamine, dioctylbenzylamine, dimethylphenethylamine, 1-dimethylamino-2-phenylpropane, N,N,N',N'-tetramethylethylenediamine, N-methylpiperidine, 2,2,6,6-N-pentamethylpiperidine, etc. The presently preferred catalyst of this class are the aliphatic amines, especially triethylamine.

Any amount of polycondensation catalyst can be employed. However, generally, effective mole proportions relative to the dihydroxy aromatic compound are within the range of from about 0.25% to about 2% and more frequently preferably are within the range of from about 0.5% to about 1% per mole of aromatic dihydroxy compound.

A phase transfer catalyst can be employed in the reaction if desired and is typically in the aqueous phase. The use of such transfer agents is optional and not essential to the practice of this invention. Examples of phase transfer catalysts are low molecular weight (less than 10 carbon atoms) quaternary ammonium, quaternary phosphonium and tertiary sulfonium compounds or mixtures thereof. These are described in detail by Stark in J.A.C.S. 93 (1971) and U.S. Pat. No. 4,201,721 whose descriptions are incorporated herein in their entirety by reference.

Any inert organic solvent can be used for the organic phase, including nonpolar solvents and medium polar solvents, such as heptane, benzene, toluene, xylene, chlorobenzene, bromobenzene, orthodichlorobenzene, methylene chloride, 1,2-dichloroethane, iodobenzene, etc. and mixtures thereof. Preferably, the solvents employed are halogenated hydrocarbons, more preferably methylene chloride.

The aromatic dihydroxy compounds utilized are dissolved in the aqueous phase of the two-phase admixture. The aqueous phase also contains an ionic surfactant. Either anionic or cationic surfactants can be utilized. Representative examples of anionic surfactants which can be employed include: carboxylic acid salts of the formula

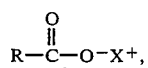

such as fatty acid salts; sulfonic acid salts of the formula

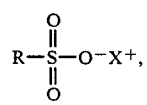

such as alkyl benzene sulfonates and sulforic acid ester salts of the formula

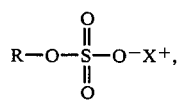

such as sulfated linear primary alcohols (sodium lauryl sulfate) and sulfated polyoxyethylenated straight chain alcohols; wherein R is a hydrocarbon radical of from 1 to 2000 carbon atoms including alkyl, cyclo, cycloalkyl, aryl and alkylaryl radicals, an X is an alkali metal such as potassium and sodium. Other anionic surfactants include phosphoric and polyphosphoric acid esters, such as phosphated polyoxyethylenated alcohols and phenols; and perfluorinated anionics such as perfluorocarboxylic acid salts.

Representative examples of cationic surfactants which can be employed include: organic amines and their salts; diamines and their salts (N-alkyltrimethylenediamine salts); polyamines and their salts (N-alkylimidazolines); quaternary ammonium salts (N-alkyltrimethyl ammonium salts or N,N-dialkyl dimethyl ammonium salts); amine oxides (N-alkyldimethyl amine oxides); polyoxyethylenated organo amines of the formula $RN[(CH_2CH_2O)_\theta H]_2$ and quaternized polyoxyethylenated organo amines $RN(CH_3)[(C_2H_4O)_\theta H]_2{}^+ Cl^-$, wherein R is as defined above and $\theta$ is a whole number.

The preferred surfactants include sodium lauryl sulfate, dodecyltrimethylammonium bromide and cetyltrimethylammonium bromide, etc.

Any quantity of surfactant can be utilized. The preferred quantity of surfactant within the aqueous phase typically falls within the range of about 100 to 1000 parts per million of said aqueous phase. The quantity of surfactant most preferred varies with the surfactant utilized. A quantity within the range of 400 to 600 parts per million is most preferred for the more common surfactants, such as sodium lauryl sulfate and dodecyltrimethylammonium bromide. Quantities of surfactant in excess of 1000 parts per million of the aqueous phase will enhance the intrinsic viscosity (chain length) of the aromatic polycarbonate produced. However, at higher concentrations the surfactant may interfere with the polymer purity and/or may create an emulsion of the two phase admixture and hence result in a difficult phase separation.

The aqueous phase also contains a strong base, including mixtures thereof, which provides a pH of 11 or higher. Representative of basic species which can be employed are the following: basic quaternary ammonium, quaternary phosphonium or tertiary sulfonium hydroxide; alkali metal hydroxides; etc. Specific examples are tetramethylammonium hydroxide, tetraethylphosphonium hydroxide, etc.; lithium hydroxide, sodium hydroxide and potassium hydroxide; etc. Especially preferred are sodium or potassium hydroxide.

Any amount of base can be employed subject to the proviso that the aqueous phase is maintained at a pH value in excess of about 11, preferably within the range of 12 to 13.5 and optionally, as high as 14. Generally, effective mole proportions of base relative to the aromatic dihydroxy compounds are within the range from about 2:1 to 5:1 and frequently preferably from about 2.1:1 to 2.5:1.

The pH is maintained at a desired value above 11 throughout the course of the reaction by any means. For example, a large excess of alkali metal hydroxide may be initially added to the reaction medium or alkaline metal hydroxide may be continuously added during the course of the reaction with the carbonyl halide.

A chain stopper may optionally be introduced into the two-phase mixture to control the degree of polymerization. Any monohydroxy compound is suitable for terminating the chain propagation. Aromatic monohydroxy compounds are preferred. Representative examples of such chain terminators are the following: phenol, alkyl-substituted phenols, halo-substituted phenols, alkoxy-substituted phenols, etc. The most preferred chain terminator is phenol, which is typically dissolved within the organic phase of the two-phase mixture with the aromatic dihydroxy compound.

The quantity of chain stopper relative to the quantity of dihydroxy aromatic compound, preferably ranges from about 0 to 3 mole % of said aromatic dihydroxy compound. Higher concentrations of chain stopper can be utilized but significantly inhibit the production of the desired high molecular weight aromatic polycarbonates.

Once the agitated two-phase mixture is formed having the proper aqueous/organic phase volume ratio, a carbonyl halide is added to and reacted within the two-phase mixture to provide the aromatic polycarbonates described above.

The expression "carbonyl halides" as employed herein and in the claims includes carbonyl dichloride, more commonly known as phosgene, carbonyl dibromide, carbonyl diiodide, carbonyl difluoride, carbonyl chlorofluoride, including mixtures thereof.

Any amount of functionally reactive dihydric aromatic compound and carbonyl halide can be employed. Generally, the carbonyl halide is present in stoichiometric amounts at least sufficient to react with the hydroxy groups associated with the dihydroxy compound. Preferably, the carbonyl halide is present in excess, i.e. in amounts of at least about 1.01 to 1.5 times the stoichiometric amounts required to completely couple all the reactive aromatic dihydroxy compounds to form the desired aromatic polycarbonates. The most preferred quantity of carbonyl halide falls within the range of about 1.05 to about 1.15 times the stoichiometric quantity described above.

The reactions can be carried out at any temperature, up to the reflux temperature of the inert organic solvent phase. Preferably, temperatures within the range of about 0° to 40° C., or higher, are utilized. Most preferably, temperatures from about 15° to 25° C. are employed.

The two phase mixture is agitated during addition of the carbonyl halide and during the reaction period until substantially complete. The aromatic polycarbonates produced have a weight average molecular weight ($\overline{M}_W$) of at least about 2000 and a $\overline{M}_W/\overline{M}_N$ of less than about 6.0. The preferred value for $\overline{M}_W$ falls within the range of about 5000 to 100,000. The most preferred value for $\overline{M}_W$ is about 10,000 to 50,000 and the preferred $\overline{M}_W/\overline{M}_N$ ratio falls within the range of from about 2.00 to 3.75. Polycarbonates of such molecular weight characteristics process easily between about 450° F. and 650° F. and are generally suitable raw materials for the manufacture of filaments, fibers, films, sheets, laminates and other thermoplastic articles of manufacture including reinforced articles employing conventional molding, extruding, etc. manufacturing techniques.

The following examples are provided to further illustrate the invention. It is not intended to limit the scope of this invention to their contents.

EXAMPLES 1–18

A series of aromatic polycarbonates were prepared according to the following general procedure. Details as to the particular reaction conditions and compositions are provided in Table I. For each of Examples 1–18, the following aqueous solution was prepared. To a 4-liter beaker were added about 1490 ml of water, 1 mole (228 grams) of bisphenol-A, a surfactant (indicated in Table I) in a quantity equal to about 500 parts/million of said aqueous solution and a quantity of sodium hydroxide sufficiently high to result in the complete dissolution of all bisphenol-A but lower than the quantity required to provide the mole ratio indicated in Table I. This aqueous solution was mixed until all the solids dissolved and was then introduced into a pre-cooled reactor.

The reactor was a jacketed glass vessel equipped with baffles, a mechanical stirring mechanism, pH electrode, condenser having a nitrogen tee, a caustic aqueous sodium hydroxide addition funnel, and a phosgene inlet. For agitation, two 3" diameter 6-bladed flat turbines were held by a teflon-coated stainless steel shaft driven by a constant rpm and variable torque-type motor (a ¼ horsepower bodine variable speed motor). The distance between the bottom of the reactor and the lower impellar blade was about 3" and that between the impellars about 5". Agitation was maintained at 800 rpm for all runs. Three vertical baffles were made by indenting the inner wall of the reactor to reduce vortex formation.

The aqueous solution, phenol, triethylamine, and methylene chloride were mixed together and introduced into the reactor at a concentration indicated in Table I. When both the pH ($\geq 11$) and temperature had stabilized, phosgenation was started. Phosgene was introduced from a calibrated flow meter at 1.15 mole of phosgene/mole of bisphenol-A over a 30 minute period.

The remaining caustic required to maintain a pH of at least 11 as well as achieve the desired caustic/BPA mole ratio indicated in Table I was added dropwise for the first 10 minutes of the reaction. Temperature and pH were observed and recorded at 5-minute intervals. After phosgenation had been terminated, a 5-minute purge with nitrogen was carried out through the system. A 500 ml sample of the reaction mixture containing the precipitated solids was taken, filtered and the solids washed twice with 3% HCl in water and then twice with water. The final product was then dried overnight at about 40° C. at 30" vacuum. The intrinsic viscosity of the final product was then determined by a single point technique with chloroform as the solvent. The intrinsic viscosity of the polymers for Examples 1–18 are recorded in Table I. Examples 1–10 represent polycarbonates produced without ionic surfactants. Examples 11–18 illustrate products obtained by this invention.

TABLE I

| | Reaction Parameters for Examples 1–18 | | | | | | |
|---|---|---|---|---|---|---|---|
| Ex. # | NaOH BPA (m/m) | MeCl$_2$ H$_2$O (v/v) | Temp (°C.) | Catalyst (mole % of BPA) | Phenol (mole % of BPA) | Surfactant (Type) | Polymer IV (dl/gm) |
| 1 | 2.5 | 0.10 | 20 | 1.0 | 3.0 | None | 0.28 |
| 2 | " | 0.05 | " | " | " | " | 0.14 |
| 3 | 4.0 | " | 0 | 0.5 | 1.5 | " | 0.28 |
| 4 | " | " | " | " | 3.0 | " | 0.23 |
| 5 | " | " | 20 | " | 1.5 | " | 0.33 |
| 6 | " | " | " | 1.0 | 3.0 | " | 0.16 |
| 7 | " | " | 0 | " | " | " | 0.18 |
| 8 | " | 0.08 | " | " | 2.0 | " | 0.25 |
| 9 | " | " | " | " | 3.0 | " | 0.17 |
| 10 | " | 0.05 | " | " | " | " | 0.21 |
| 11 | 4.0 | 0.1 | 0 | 1.0 | 3.0 | SLS | 0.60 |

TABLE I-continued

Reaction Parameters for Examples 1-18

| Ex. # | NaOH BPA (m/m) | MeCl₂ H₂O (v/v) | Temp (°C.) | Catalyst (mole % of BPA) | Phenol (mole % of BPA) | Surfactant (Type) | Polymer IV (dl/gm) |
|---|---|---|---|---|---|---|---|
| 12 | " | " | " | " | " | " | 0.55 |
| 13 | " | 0.05 | " | 1.0 | " | " | 0.38 |
| 14 | " | " | " | " | " | " | 0.40 |
| 15 | " | 0.10 | " | " | " | " | 0.52 |
| 16 | " | 0.08 | " | " | " | " | 0.46 |
| 17 | " | 0.10 | " | " | " | DTAB | 0.49 |
| 18 | " | " | " | " | " | " | 0.51 |

SLS = Sodium Lauryl Sulfate (an anionic surfactant)
DTAB = Dodecyl-trimethylammonium Bromide (a cationic surfactant)

EXAMPLES 19-27

A series of aromatic polycarbonates were prepared according to the procedure outlined in Examples 1-18. Examples 19-27 illustrate the different effects of various surfactants, including non-ionic surfactants. Details as to the reaction conditions and reaction compositions are provided in Table II along with the form of the aromatic polycarbonates obtained. Examples 19-24 represent products obtained by the process comprising this invention.

TABLE II

Reaction Parameters for Experiments 19-27

| Run | NaOH BPA (m/m) | MeCl₂ H₂O (v/v) | Temp (°C.) | Surfactant | PPM of Surfactant | Polymer Product Form |
|---|---|---|---|---|---|---|
| 19 | 4.0 | 0.10 | 0 | SLS | 500 | Finely Divided |
| 20 | 4.0 | 0.08 | 0 | SLS | 500 | Finely Divided |
| 21 | 4.0 | 0.10 | 0 | DTAB | 500 | Finely Divided |
| 22 | 4.0 | 0.10 | 0 | DTAB | 500 | Finely Divided |
| 23 | 4.0 | 0.10 | 0 | SLS | 500 | Finely Divided |
| 24 | 4.0 | 0.10 | 0 | CTAB | 500 | Finely Divided |
| 25 | 4.0 | 0.10 | 0 | Surfynol 104 | 500 | Globular |
| 26 | 4.0 | 0.10 | 0 | Triton-X 100 | 500 | Globular |
| 27 | 4.0 | 0.10 | 0 | Surfynol 82 | 500 | Globular |

SLS = Sodium lauryl sulfate (an anionic surfactant)
DTAB = Dodecyltrimethylammonium bromide (a cationic surfactant)
CTAB = Cetyltrimethylammonium bromide (a cationic surfactant)
Surfynol 104, Triton-X 100, Surfynol 82 - all non-ionic surfactants The aromatic polycarbonates derived from this process (Examples 11-24) exhibit an intrinsic viscosity of at least 0.38 deciliters per gram at 25° C. For some surfactants, consistently high intrinsic viscosities of above 0.40 and 0.45 dl/g were obtained. Especially useful NSH-polycarbonates generally have intrinsic viscosities within the range of from about 0.4 to about 0.7 dl/g.

We claim:

1. A method of producing aromatic polycarbonate by a catalyzed interfacial polycondensation polycarbonate process comprising
   (1) forming an agitated two-phase admixture comprising
      (i) an organic phase containing an inert organic solvent and a polycondensation catalyst,
      (ii) an aqueous phase containing dissolved therein an aromatic dihydroxy compound, a strong base and an ionic surfactant in a quantity of from about 100 to 1,000 parts per million having a pH of at least 11 subject to the proviso that
         (a) the volume ratio of inert organic solvent phase to aqueous phase is within the range of from about 0.04:1 to 0.20:1 and
         (b) the mole ratio of base to aromatic dihydroxy compound is at least about 0.25:1,
   (2) adding and reacting a carbonyl halide with the aromatic dihydroxy compound to form an aromatic polycarbonate having a weight average molecular weight of at least about 2000, and
   (3) separating and recovering the solid aromatic polycarbonate particulate from the liquid aqueous phase.

2. The claim 1 process wherein the aromatic dihydroxy compound has the formula,

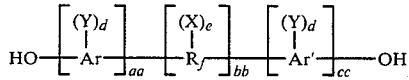

wherein $R_f$ is selected from (a) a group of hydrocarbon linkages consisting of alkylene, alkylidene, cycloalkylene, cycloalkylidene and arylene linkage and mixtures thereof, and (b) a linkage selected from the group consisting of ether, carbonyl, amine, sulfur and phosphorous linkages; Ar and Ar' are arene radicals; Y is a monovalent radical selected from bromine, chlorine, alkyl and alkoxy radicals; each d represents a whole number from zero up to a maximum equivalent to the number of replaceable hydrogens substituted on the aromatic rings comprising Ar and Ar', subject to the proviso that when d is equal to 2 or more, no more than one Y group is ortho-positioned relative to an OH group; X is a monovalent radical selected from the group consisting of bromine, chlorine, alkyl, aryl, and cycloalkyl radicals and mixtures thereof; e represents a whole number of from zero to a maximum of the number of replaceable hydrogens on $R_f$; aa, bb and cc represent whole numbers including zero, with the proviso that when bb is not zero, neither aa nor cc are zero, and when bb is zero, aa or cc but not both include zero.

3. The claim 2 process wherein the dihydric phenol is of the formulas

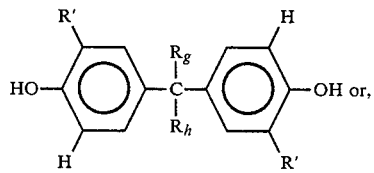

-continued

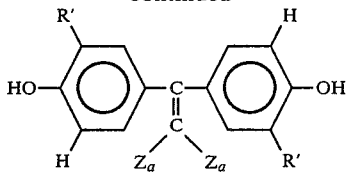

where independently each R' is selected from the group consisting of hydrogen, bromine, chlorine, alkyl radicals of from 1 to 4 carbon atoms and alkoxy radicals of from 1 to 4 carbon atoms, $R_g$ and $R_h$ are selected from the group consisting of hydrogen and alkyl radicals of from 1 to 2 carbon atoms, each $Z_a$ is selected from the group consisting of hydrogen, chlorine and bromine, subject to the proviso that at least one $Z_a$ is chlorine or bromine.

4. The claim 3 process wherein a non-sterically-hindered aromatic dihydroxy compound is present as a major portion relative to a minor portion of sterically-hindered aromatic dihydroxy compound.

5. The claim 4 process wherein the non-sterically-hindered aromatic dihydroxy compound is at least 90 mole percent.

6. The claim 5 process wherein the non-sterically-hindered dihydroxy compound is bis(4-hydroxyphenyl)-propane-2,2, and the base is an alkali metal hydroxide.

7. The claim 6 process wherein the bis(4-hydroxyphenyl)propane-2,2 portion is 100 mole %, said inert organic solvent is methylene chloride, a phenol chain stopper is added to the organic phase, said polycondensation catalyst is triethylamine, said base is sodium hydroxide, the aqueous phase pH is within the range of from 11.0 to 14.0, the mole ratio of sodium hydroxide to bisphenol-A is within the range of from about 1:1 to 4.0:1, and the aromatic polycarbonate produced has a $\overline{M}_W$ within the range of from about 5000 to 100,000 with a $\overline{M}_W/\overline{M}_N$ ratio within the range from about 2.00 to 3.75 and an intrinsic viscosity above 0.40 dl/g.

8. The claim 6 process wherein the pH is at least about 12.

9. The method as in claim 1 wherein said organic phase also contains a chain stopper.

10. The method as in claim 11 wherein said chain stopper is phenol.

11. A method as in claim 1 wherein the ionic surfactant is selected from the group consisting of sodium lauryl sulfate, dodecyl-trimethylammonium bromide and cetyltrimethylammonium bromide.

12. A method as in claim 11 wherein the surfactant is utilized in a quantity within the range of about 400–600 parts/million per aqueous phase.

13. A method as in claim 12 wherein the ionic surfactant utilized is sodium lauryl sulfate in a quantity of about 500 parts/million of the aqueous phase.

14. A method as in claim 7 wherein the ionic surfactant is selected from the group consisting of sodium lauryl sulfate, dodecyl-trimethylammonium bromide and cetyltrimethylammonium bromide.

15. A method as in claim 14 wherein the surfactant is utilized in a quantity within the range of about 400–600 parts/million per aqueous phase.

16. A method as in claim 15 wherein the ionic surfactant utilized is sodium lauryl sulfate in a quantity of about 500 parts/million of the aqueous phase.

* * * * *